United States Patent [19]
Miura et al.

[11] Patent Number: 6,134,024
[45] Date of Patent: Oct. 17, 2000

[54] DITHERING DEVICE

[75] Inventors: Hideki Miura; Koji Urasawa, both of Tokyo, Japan

[73] Assignee: Oki Data Corporation, Tokyo, Japan

[21] Appl. No.: 09/139,187

[22] Filed: Aug. 25, 1998

[30] Foreign Application Priority Data

Aug. 29, 1997 [JP] Japan .................................. 9-249611

[51] Int. Cl.⁷ .............................. H04N 1/405; H04N 1/52
[52] U.S. Cl. ........................... 358/1.9; 358/456; 358/460; 358/466; 358/534; 382/270; 382/237
[58] Field of Search ........................... 358/1.9, 456, 460, 358/466, 298, 457; 382/237, 270

[56] References Cited

U.S. PATENT DOCUMENTS

| | | | |
|---|---|---|---|
| 5,166,809 | 11/1992 | Surbrook et al. | 358/456 |
| 5,495,346 | 2/1996 | Choi et al. | 358/1.9 |
| 5,953,459 | 9/1999 | Ueda et al. | 358/298 |

*Primary Examiner*—Scott Rogers
*Assistant Examiner*—Gholam A. Behpour
*Attorney, Agent, or Firm*—Akin, Gump, Strauss, Hauer & Feld, L.L.P.

[57] ABSTRACT

A dithering device converts a multi-gradation image into a binary image by comparing, in sequence, values of pixels forming the multi-gradation image with threshold values of corresponding elements forming a dither matrix. For determining the element corresponding to the pixel, the dithering device uses an array representing a relationship between a first group of positions of the elements to be used currently and a second group of positions of the elements to be used next. By referring to the array, the dithering device determines the position of the element from the second group based on the position of the element in the first group so as to compare the next pixel with the threshold value of the determined element.

7 Claims, 16 Drawing Sheets

| Pxc | Pxn |
|---|---|
| 0 | 1 |
| 1 | 2 |
| 2 | 3 |
| 3 | 0 |

20a

| Pyc | Pyn |
|---|---|
| 0 | 1 |
| 1 | 2 |
| 2 | 3 |
| 3 | 0 |

20b

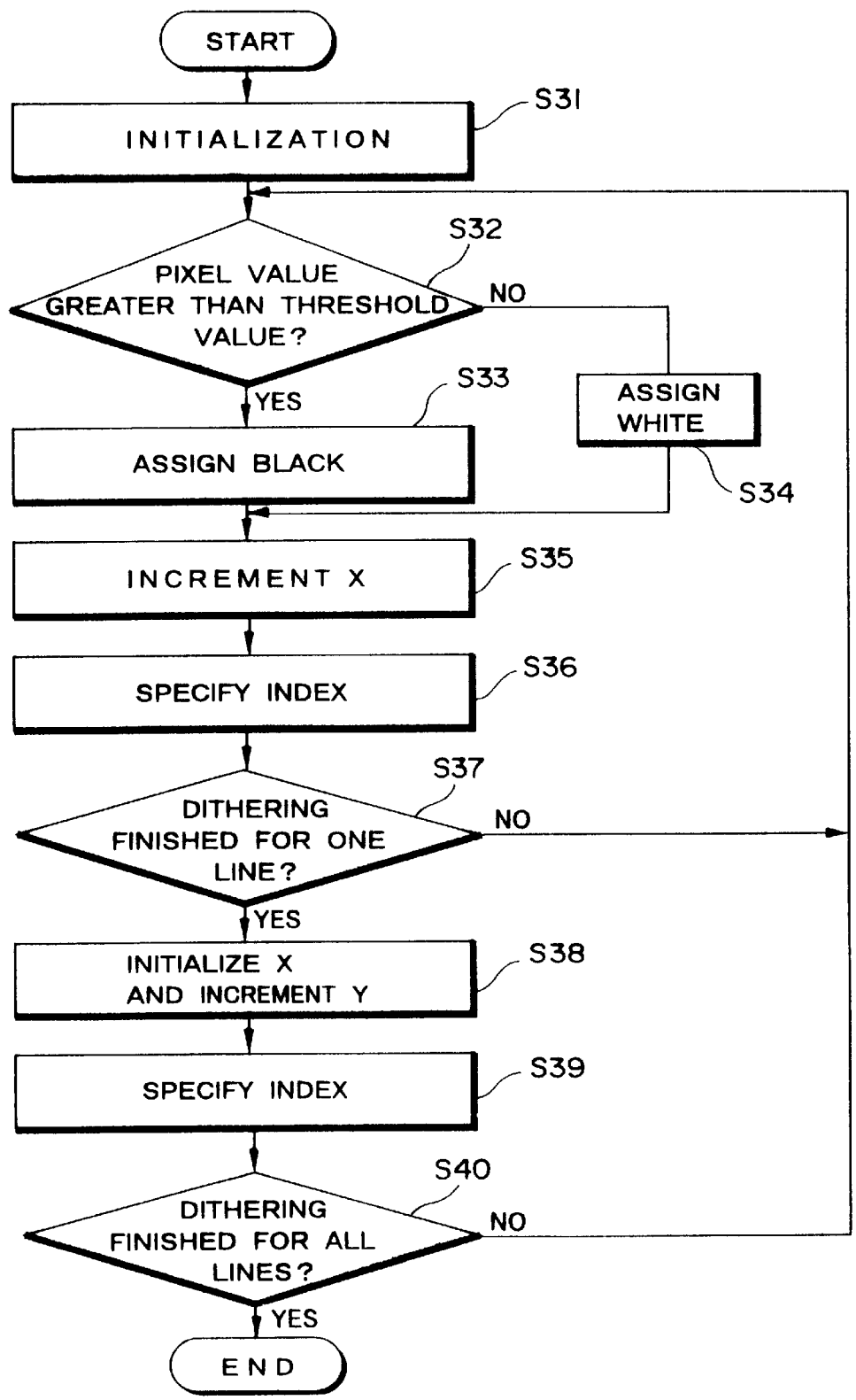

| Pxc | Pxn |
|---|---|
| 0 | 1 |
| 1 | 4 |
| 2 | 3 |
| 3 | 6 |
| 4 | 5 |
| 5 | 8 |
| 6 | 7 |
| 7 | 10 |
| 8 | 9 |
| 9 | 12 |
| 10 | 11 |
| 11 | 14 |
| 12 | 13 |
| 13 | 0 |
| 14 | 15 |
| 15 | 2 |

| Pyc | Pyn |
|---|---|
| 0 | 2 |
| 1 | 3 |
| 2 | 4 |
| 3 | 5 |
| 4 | 6 |
| 5 | 7 |
| 6 | 8 |
| 7 | 9 |
| 8 | 10 |
| 9 | 11 |
| 10 | 12 |
| 11 | 13 |
| 12 | 14 |
| 13 | 15 |
| 14 | 0 |
| 15 | 1 |

DITHERING DEVICE

BACKGROUND OF THE INVENTION

1. Field of the Invention

The present invention relates to a dithering device for converting a multi-gradation image (multi-bit pixel value image) into a monochrome or binary image (one-bit pixel value image) through comparison using a dither matrix and, in particular, to a technique for locating elements, i.e. threshold values, in the dither matrix with respect to corresponding pixels of the multi-gradation image.

2. Description of the Prior Art

As one of techniques for converting an image represented by pixels each having a multi-bit or multi-gradation value into an image having pixels each represented by one of only two gradations, i.e. white or black, there has been available a dithering method. In the dithering method, a dither matrix having a plurality of elements each assigned a corresponding threshold value is logically overlaid upon a multi-gradation image for comparison between the threshold values of the dither matrix and values of corresponding pixels of the multi-gradation image. Then, when the value of the pixel of the multi-gradation image is greater than the corresponding threshold value, that pixel is set to black. On the other hand, when the value of the pixel is not greater than the corresponding threshold value, that pixel is set to white. In this fashion, the multi-gradation image is converted into the white/black binary image, which is called "dithering".

In the following explanation, a position of a pixel on a multi-gradation image is represented by coordinates (X, Y), a position of an element (hereinafter referred to as "index") on a dither matrix corresponding to a pixel (X, Y) is represented by coordinates (Px, Py), and lengths of the dither matrix in Px-axis and Py-axis directions are represented by DSx and DSy, respectively.

There have been available two methods for determining a corresponding index in the dithering, that is, a modulo arithmetic method and a conditional branching method.

The modulo arithmetic method is carried out in the following manner:

For dithering a pixel (X, Y), remainder of division (X/DSx) is set to Px, remainder of division (Y/DSy) is set to Py, then a value of the pixel (X, Y) and a threshold value of an index (Px, Py) are compared with each other so as to assign a binary value (white or black) to the pixel.

On the other hand, the conditional branching method is carried out in the following manner:

As a pixel to be dithered shifts from (X, Y) to (X+1, Y+1), a corresponding index also shifts from (Px, Py) to (Px+1, Py+1). Then, when Px reaches DSx, Px returns to an initial value. Similarly, when Py reaches DSy, Py returns to an initial value. For example, it is assumed that DSx=4 and DSy=4, that all pixels of a two-dimensional multi-gradation image are dithered by repeating X-axis direction dithering in a Y-axis direction, and that initial coordinates of an index are (0, 0). In this case, as a pixel to be dithered changes, a corresponding index changes as (0, 0), (1, 0), (2, 0), (3, 0), (0, 1), (1, 1), (2, 1), . . . , (3, 3), wherein the change of the index from (3, 0) to (0, 1) represents that Px returns to an initial value 0.

In the former modulo arithmetic method, however, the time-consuming division is required to be carried out. Thus, it is difficult to shorten the processing time. In the latter conditional branching method, every time a pixel (X, Y) to be dithered is changed, it is necessary to determine whether Px or Py of an index (Px, Py) corresponding to the pixel (X, Y) has reached the size of the dither matrix DSx or DSy, thereby to periodically initialize Px or Py. Such a determination, however, changes a subsequent process depending on its result. Therefore, if the conditional branching method is performed upon pipeline processing which aims at speed-up processing based on pre-reading of instructions, it may occur that the pre-read instructions are not executed depending on a result of the foregoing determination. Thus, the merits of the pipeline processing can not be fully exercised in the conditional branching method.

As described above, the modulo arithmetic method and the conditional branching method both have the common problem that it is difficult to shorten the processing time for determining an index corresponding to a pixel to be dithered next.

SUMMARY OF THE INVENTION

Therefore, it is an object of the present invention to provide an improved dithering device.

According to one aspect of the present invention, there is provided a dithering device for converting a multi-gradation image into a binary image by comparing, in sequence, values of pixels forming the multi-gradation image with threshold values assigned to elements forming a dither matrix which elements are logically located at positions corresponding to positions of the pixels, the dithering device comprising a storage circuit storing an array representing a relationship between a first group of the positions of the elements each corresponding to first one of the pixels and a second group of the positions of the elements each corresponding to second one of the pixels, the second one of the pixels compared next to the corresponding first one of the pixels; and a determination circuit which, by referring to the array, determines the position of the element from the second group based on the position of the element in the first group for comparing the second one of the pixels with the threshold value of the element determined by the determination circuit.

It may be arranged that the dithering device further comprises a producing circuit for producing the array based on the dither matrix.

It may be arranged that the storage circuit stores in advance the array which is produced based on the dither matrix.

It may be arranged that the relationship of the array recurs per cycle of the number of the elements.

According to another aspect of the present invention, there is provided a dithering device for converting a multi-gradation image into a binary image by comparing, in sequence, values of pixels forming the multi-gradation image with threshold values assigned to elements forming a dither matrix which elements are logically located at positions corresponding to positions of the pixels, the dithering device comprising a first storage circuit storing a first array representing a relationship between a first group of the positions of the elements each corresponding to first one of the pixels and a second group of the positions of the elements each corresponding to second one of the pixels, the second one of the pixels compared next to the corresponding first one of the pixels in an X-axis direction of the multi-gradation image; a second storage circuit storing a second array representing a relationship between a third group of the positions of the elements each corresponding to third one of the pixels and a fourth group of the positions of the elements each corresponding to fourth one of the pixels, the fourth one of the pixels compared next to the corresponding third one of the pixels in a Y-axis direction of the multi-gradation image; and a determination circuit which, by referring to one of the first and second arrays, determines the position of the element from one of the second and fourth groups based on the position of the element in one of the first and third groups for comparing one of the second and fourth ones of the pixels with the threshold value of the element determined by the determination circuit.

It may be arranged that the dither matrix has an essentially Z shape.

It may be arranged that the relationship of each of the first and second arrays recurs per cycle of the number of the elements.

BRIEF DESCRIPTION OF THE DRAWINGS

The present invention will be understood more fully from the detailed description given hereinbelow, taken in conjunction with the accompanying drawings.

In the drawings:

FIG. 6 is a flowchart representing an operation of the dithering device shown in FIG. 5;

FIGS. 12A and 12B are diagrams showing an X-axis direction recurring array and a Y-axis direction recurring array, respectively, to be used in the dithering device shown in FIG. 10;

DESCRIPTION OF THE PREFERRED EMBODIMENT

Prior to description of the preferred embodiments of the present invention, the conventional dithering will be explained for facilitating understanding of the present invention.

Figure 15:
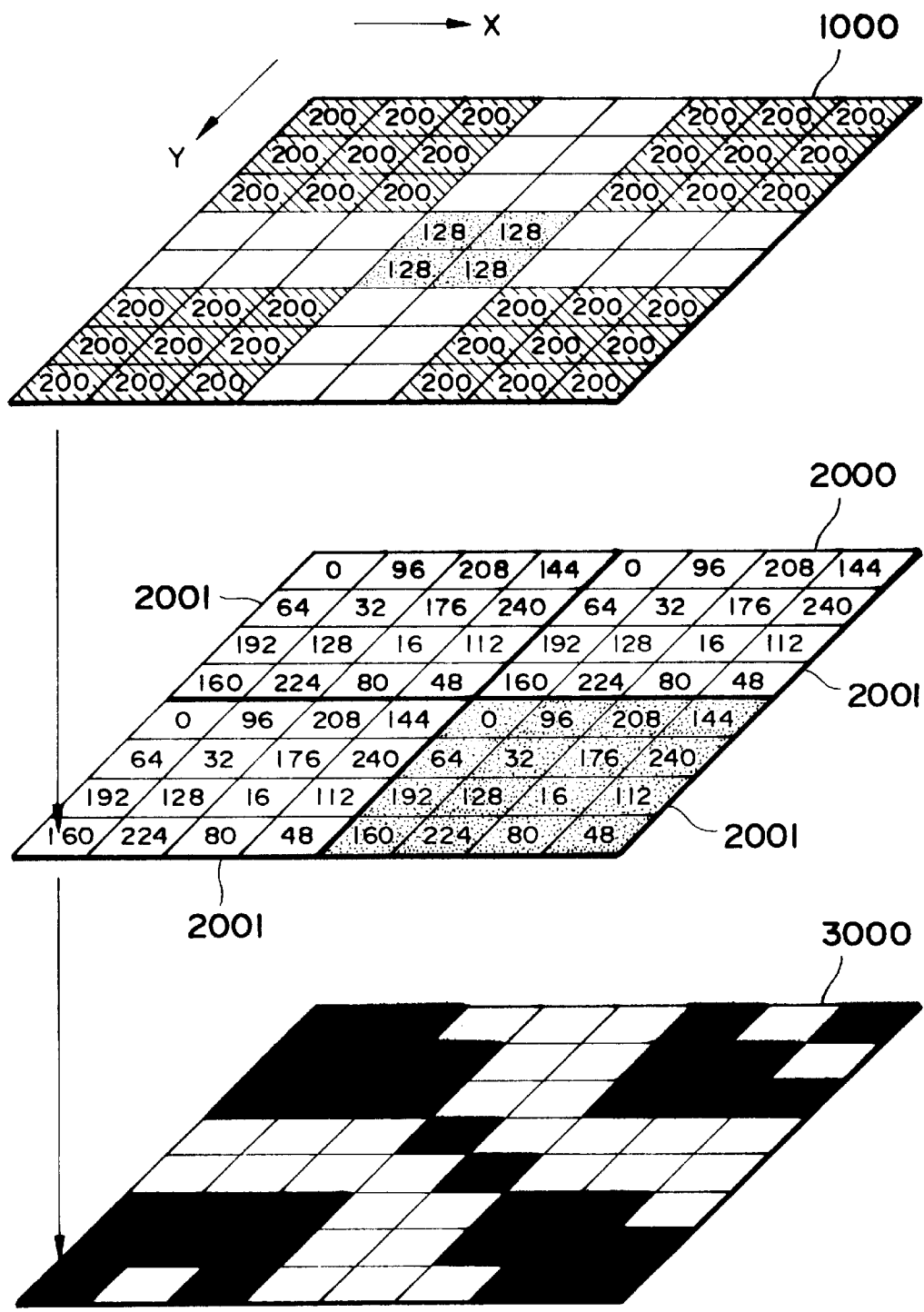
FIG. 15 is a diagram for explaining the conventional dithering.

FIG. 15 is a diagram for explaining the conventional dithering.

A multi-gradation image 1000 is composed of 64 (8=8) pixels. Each of the pixels is assigned a value of 0 to 255 for representing the image 1000 with 256 gradations. A dither pattern 2000 is composed of four identical dither matrices 2001. Each dither matrix 2001 includes 16 (4=4) elements corresponding to 16 (4=4) pixels of the image 1000, and the elements are assigned corresponding threshold values, respectively.

In the dithering, a value of each pixel is compared with a corresponding threshold value. If a value of a pixel is greater than a corresponding threshold value, that pixel is assigned black and, if not greater, that pixel is assigned white. For example, a value 200 of a pixel (0, 7) is compared with a corresponding threshold value 160 and, as a result, given black. By carrying out such comparison for all the pixels, the multi-gradation image 1000 is converted into a binary image 3000.

Figure 16:
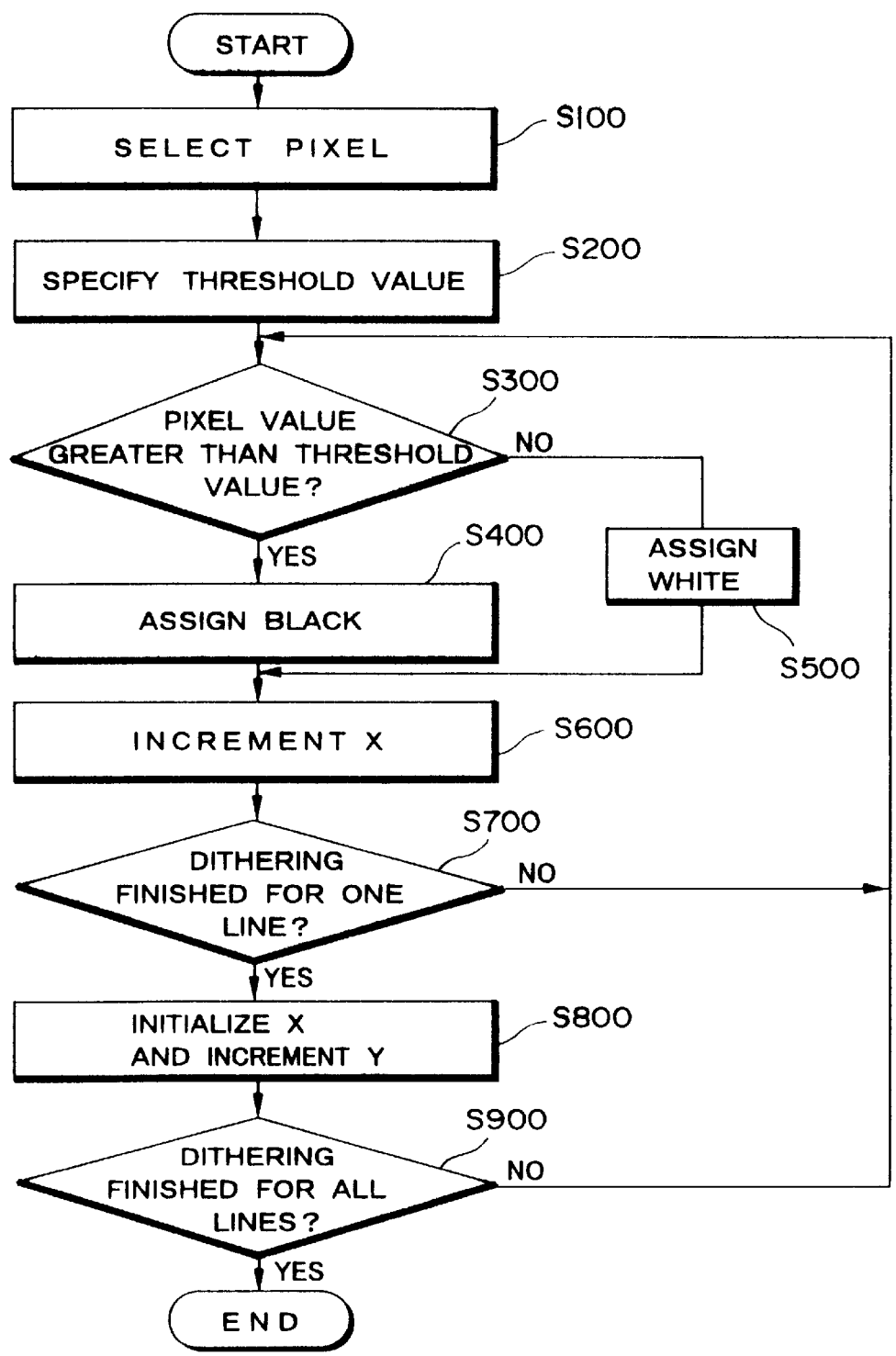
FIG. 16 is a flowchart showing a procedure of the conventional dithering.

FIG. 16 is a flowchart representing a procedure of the conventional dithering. At step S100, one pixel is selected from among 64 pixels of the image 1000. At step S200, a threshold value corresponding to the selected pixel is specified in the dither pattern 2000. At step S300, a value of the selected pixel and the specified threshold value are compared with each other. If the pixel value is greater than the threshold value, that pixel is given black at step S400. If the pixel value is not greater than the threshold value, that pixel is given white at step S500. At step S600, a value of X is incremented by one for selecting the next pixel.

At step S700, it is determined whether the dithering of pixels for one line, i.e. consecutive 8 pixels in an X-axis direction, has been finished. If the dithering of the one-line pixels has been finished, a value of X is initialized to 0, and a value of Y is incremented by one. By incrementing the value of Y, a line to be dithered is updated. If the dithering of the one-line pixels has not been finished, the routine returns to step S100 where a pixel located next to the dithered pixel in the X-axis direction is subjected to dithering. At step S900, it is determined whether the dithering of all the pixels has been finished. If the dithering of all the pixels has been finished, the dithering of the image 1000 is completed. On the other hand, if not yet finished, the routine returns to step S100 so as to carry out the dithering of pixels on the line updated at step S800.

Figure 17:
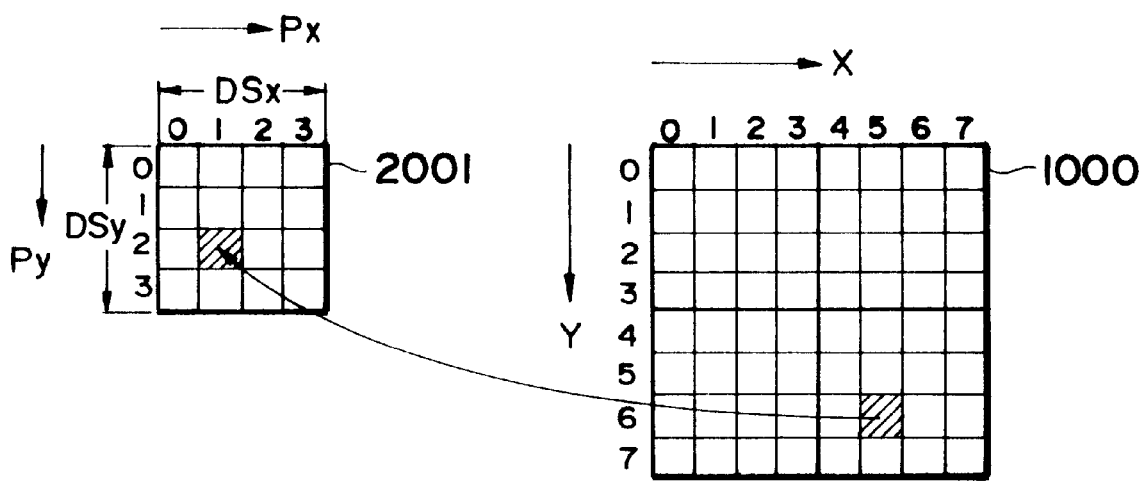
FIG. 17 is a diagram for explaining how to specify a threshold value corresponding to a selected pixel using a modulo arithmetic method in the conventional dithering.

FIG. 17 is a diagram for explaining how to specify the threshold value corresponding to the selected pixel at step S200 in FIG. 16, using the modulo arithmetic method.

The following equations (1) and (2) are used for deriving an index (Px, Py) in the dither matrix 2001 having a threshold value corresponding to a pixel (X, Y) in the image 1000:

$$Px = X \bmod DSx \quad (1)$$

$$Py = Y \bmod DSy \quad (2)$$

wherein mod represents modulo arithmetic, DSx a length of the dither matrix 2001 in a Px-axis direction, and DSy a length of the dither matrix 2001 in a Py-axis direction. In this example, DSx=4 and DSy=4. For example, as shown in FIG. 17, an index (1, 2) in the dither matrix 2001 is derived with respect to a pixel (5, 6) in the image 1000 using the equations (1) and (2).

Now, the first preferred embodiment of the present invention will be described hereinbelow.

Figures 1, 2:
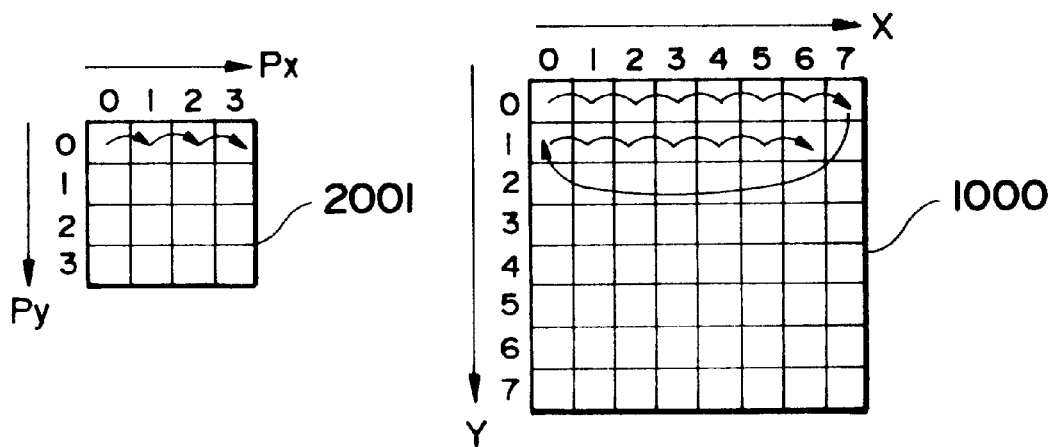
FIG. 1 is a diagram showing recurring arrays, each representing a relationship between current indices and next indices, to be used in dithering according to a first preferred embodiment of the present invention.
FIG. 2 is a diagram for explaining the dithering using the recurring arrays shown in FIG. 1.

In this embodiment, an index is derived using recurring arrays 20a and 20b shown in FIG. 1. The recurring array 20a shows a relationship between a current index Pxc, i.e. an index corresponding to a pixel to be dithered currently, and a next index Pxn, i.e. an index corresponding to a pixel to be dithered next, and the relationship recurs per cycle of 0 to 3. For example, it is assumed that an index corresponding to a pixel (2, 0) is (2, 0). Then, by referring to the recurring array 20a, it can be seen that Pxn corresponding to Pxc=2 is 3. Thus, it is determined that a next pixel (3, 0) should be dithered using a threshold value of an index (3, 0). Similarly, assuming that a current index is (3, 0), it is seen from the recurring array 20a that Pxn corresponding to Pxc=3 is 0. Thus, it is determined that a next pixel (4, 0) should be dithered using a threshold value of an index (0, 0).

Like the recurring array 20a, the recurring array 20b shows a relationship between a current index Pyc and a next index Pyn. Using the recurring arrays 20a and 20b, as a pixel (X, Y) to be dithered changes on the image 1000, a corresponding index (Px, Py) can be obtained on the dither matrix 2001 as seen from FIG. 2.

As described above, by using the recurring arrays 20a and 20b, an index can be determined without using the modulo arithmetic method or the conditional branching method as opposed to the conventional dithering. For example, by initially setting that a pixel (0, 0) and an index (0, 0) correspond to each other, an index (1, 0) can be specified for a pixel (1, 0), an index (0, 0) for a pixel (4, 0), and an index (0, 1) for a pixel (0, 1).

Figure 3:
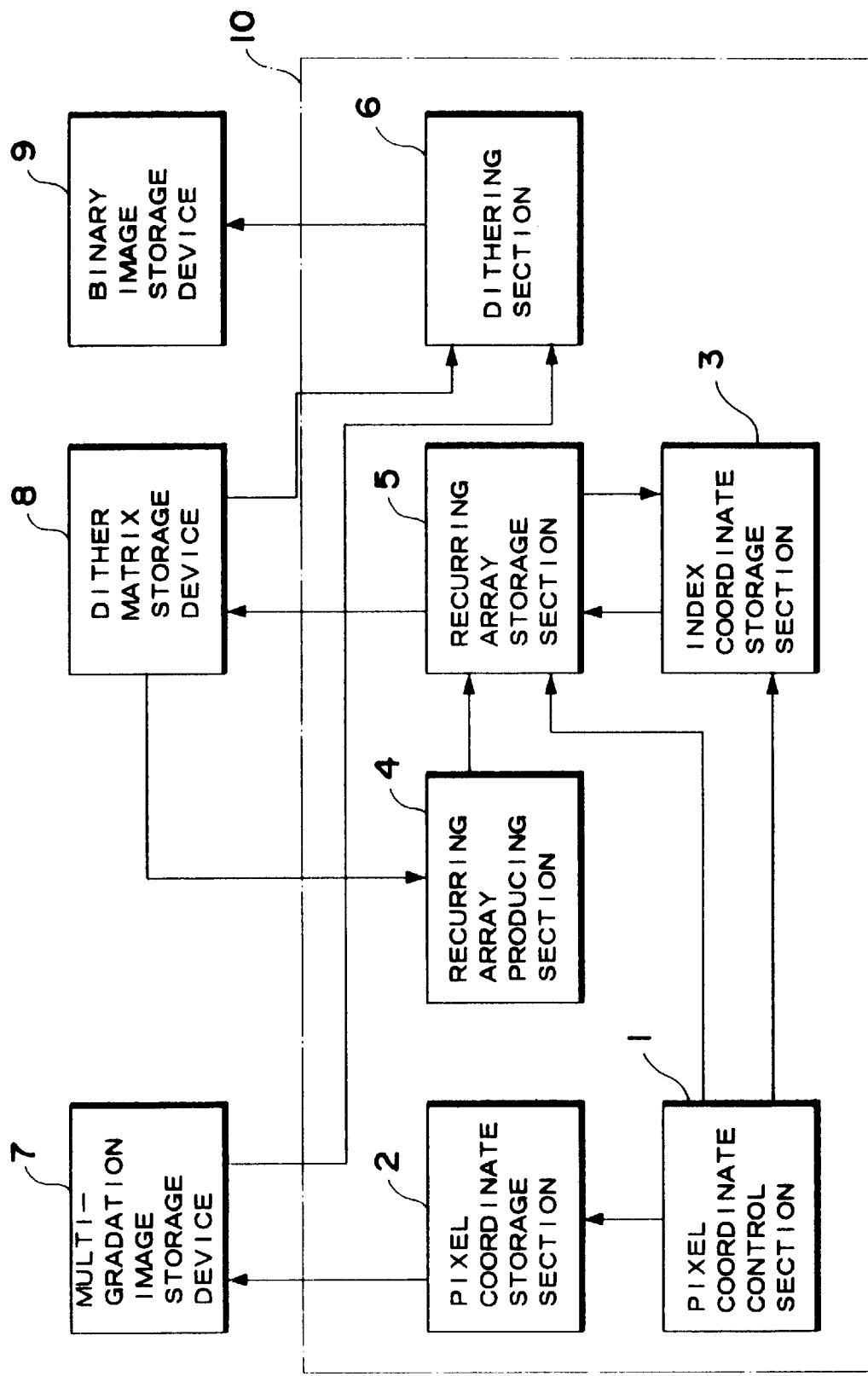
FIG. 3 is a diagram showing a structure of a dithering device according to the first preferred embodiment of the present invention.

FIG. 3 is a diagram showing a structure of a dithering device in this embodiment. The dithering device includes a dithering unit 10 which comprises a pixel coordinate control section 1, a pixel coordinate storage section 2, an index coordinate storage section 3, a recurring array producing section 4, a recurring array storage section 5 and a dithering section 6. The dithering device further includes a multi-gradation image storage device 7, a dither matrix storage device 8 and a binary image storage device 9. The multi-gradation image storage device 7 stores the multi-gradation image 1000 to be dithered. The dither matrix storage device 8 stores the dither matrix 2001. The binary image storage device 9 stores a binary image 3000 (see FIG. 15) obtained by dithering the multi-gradation image 1000.

The pixel coordinate control section 1 manages coordinates of the pixels forming the multi-gradation image 1000 so as to select coordinates (X, Y) of a pixel to be dithered. The pixel coordinate storage section 2 stores the pixel coordinates selected by the pixel coordinate control section 1. The index coordinate storage section 3 stores coordinates (Px, Py) of an index corresponding to the selected pixel. The recurring array producing section 4 produces the recurring arrays 20a and 20b suitable for the dither matrix 2001. Specifically, the recurring array producing section 4 produces the recurring arrays 20a and 20b based on the lengths of the dither matrix 2001 in the Px-axis and Py-axis directions. The recurring array storage section 5 stores the produced recurring arrays 20a and 20b. As described above, an index (Px, Py) corresponding to a selected pixel (X, Y) is specified by referring to the recurring arrays 20a and 20b. The dithering section 6 converts the multi-gradation image 1000 into the binary image 3000 by comparing, in sequence, values of the selected pixels (X, Y) and threshold values of the corresponding indices (Px, Py) with each other. More specifically, if the value of the pixel (X, Y) is greater than the threshold value of the corresponding index (Px, Py), the dithering section 6 assigns black to that pixel and, if not greater, it assigns white to that pixel. The binary image storage device 9 stores the binary image 3000 produced through conversion carried out by the dithering section 6.

Figure 4:
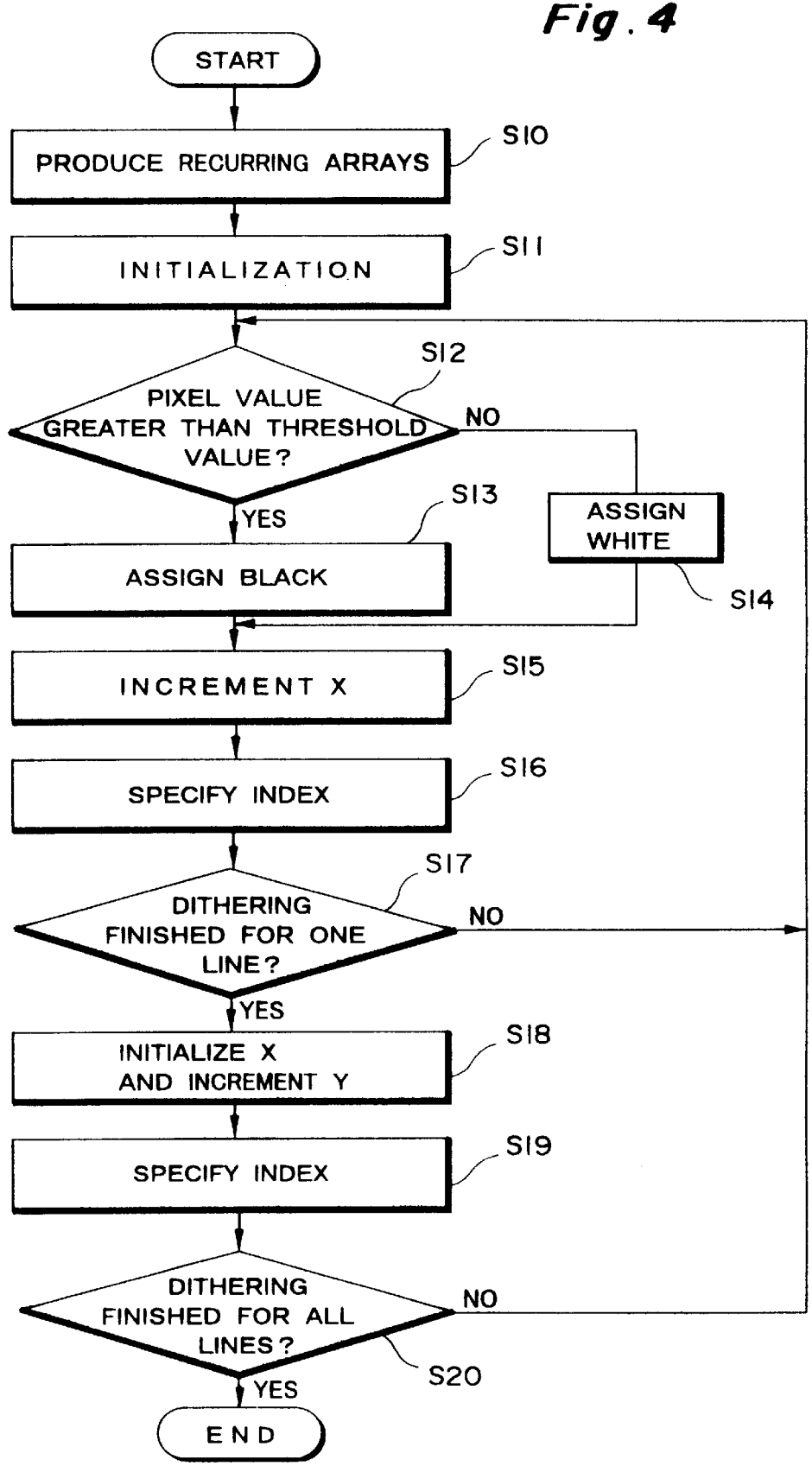
FIG. 4 is a flowchart representing an operation of the dithering device shown in FIG. 3.

Now, an operation of the dithering device in this embodiment will be described with reference to a flowchart shown in FIG. 4.

At step S10, the recurring array producing section 4 produces the recurring arrays 20a and 20b suitable for the dither matrix 2001 as shown in FIG. 1, based on the lengths DSx and DSy of the dither matrix 2001 in the Px-axis and Py-axis directions. Then, the recurring array storage section 5 stores the produced recurring arrays 20a and 20b.

At step S11, the pixel coordinate control section 1 initializes a pixel (X, Y) to be selected and a corresponding index (Px, Py) so that X=0, Y=0, Px=0 and Py=0.

At step S12, the dithering section 6 compares a value of a pixel (0, 0) with a threshold value of an index (0, 0). If the value of the pixel (0, 0) is greater than the threshold value of the index (0, 0), the dithering section 6 assigns black to the pixel (0, 0) at step S13 and, if not greater, it assigns white to the pixel (0, 0) at step S14.

At step S15, the pixel coordinate control section 1 increments a value of X by one so that a pixel to be dithered changes from the pixel (0, 0) to a pixel (1, 0).

At step S16, the pixel coordinate control section 1 refers to the recurring array 20a and learns that Pxn corresponding to Pxc=0 is 1. Thus, the pixel coordinate control section 1 determines an index (1, 0) with respect to the pixel (1, 0).

At step S17, it is determined whether the dithering of pixels for one line, i.e. consecutive 8 pixels in the X-axis direction of the image 1000, has been finished. Since a pixel to be dithered next is the pixel (1, 0), the pixel coordinate control section 1 determines that the dithering of the consecutive 8 pixels in the X-axis direction has not been finished so that the routine returns to step S12. At step S12, the dithering section 6 dithers the next pixel (1, 0).

When the dithering of the pixels (0, 0) to (7, 0) for one line has been finished by repeating the execution of steps S12 to S16, the pixel coordinate control section 1 initializes a value of X to 0 and increments a value of Y by 1 at step S18. As a result, the pixel coordinate control section 1 specifies a pixel (0, 1) as a pixel to be dithered next.

At step S19, the pixel coordinate control section 1 refers to the recurring arrays 20a and 20b and learns that Pxn corresponding to Pxc=3 is 0 and Pyn corresponding to Pyc=0 is 1. Specifically, the pixel coordinate control section 1 learns that an index corresponding to the pixel (0, 1) to be dithered next to the pixel (7, 0) whose corresponding index is (3, 0), is an index (0, 1).

At step S20, the pixel coordinate control section 1 determines whether the dithering for all the lines has been finished. If not yet finished, the routine returns to step S12 to repeat the execution of steps S12 to S19. On the other hand, if finished for all the lines, the dithering of the image 1000 is completed.

As described above, according to the dithering device of the first preferred embodiment, the recurring arrays 20a and 20b are produced based on the dither matrix 2001 to be used in dithering the image 1000, and the indices (Px, Py) corresponding to the pixels (X, Y) to be dithered are obtained using the recurring arrays 20a and 20b. Therefore, since the modulo arithmetic method is not used, the processing amount for determining the indices can be reduced as compared with the conventional method as explained with reference to FIGS. 15 to 17.

On the other hand, in the conventional conditional branching method, in parallel to processing of sequentially changing pixels to be dithered, such processing is carried out that, for example, upon changing a pixel to be dithered from (3, 0) to (4, 0), Px of an index (Px, Py) is initialized to 0 from 3. For detecting this time point, every time a value of X is incremented, i.e. every time a pixel to be dithered is changed, it is necessary to determine whether the incremented value of X has reached 4. Accordingly, in the conventional conditional branching method, the conditional determination is required as many times as the number of the pixels to be dithered. On the other hand, in the dithering device of the first preferred embodiment, since it is not necessary to carry out the conditional determination for detecting a time point for initialization of Px every time a pixel to be dithered changes, the processing amount for determining the indices can be reduced as compared with the conventional conditional branching method. Further, by performing the method of deriving the indices using the recurring arrays while performing the pipeline processing, the merits of the pipeline processing, i.e. the speed-up of processing based on the instruction pre-reading, can be achieved to the maximum.

Now, the second preferred embodiment of the present invention will be described hereinbelow.

Figure 5:
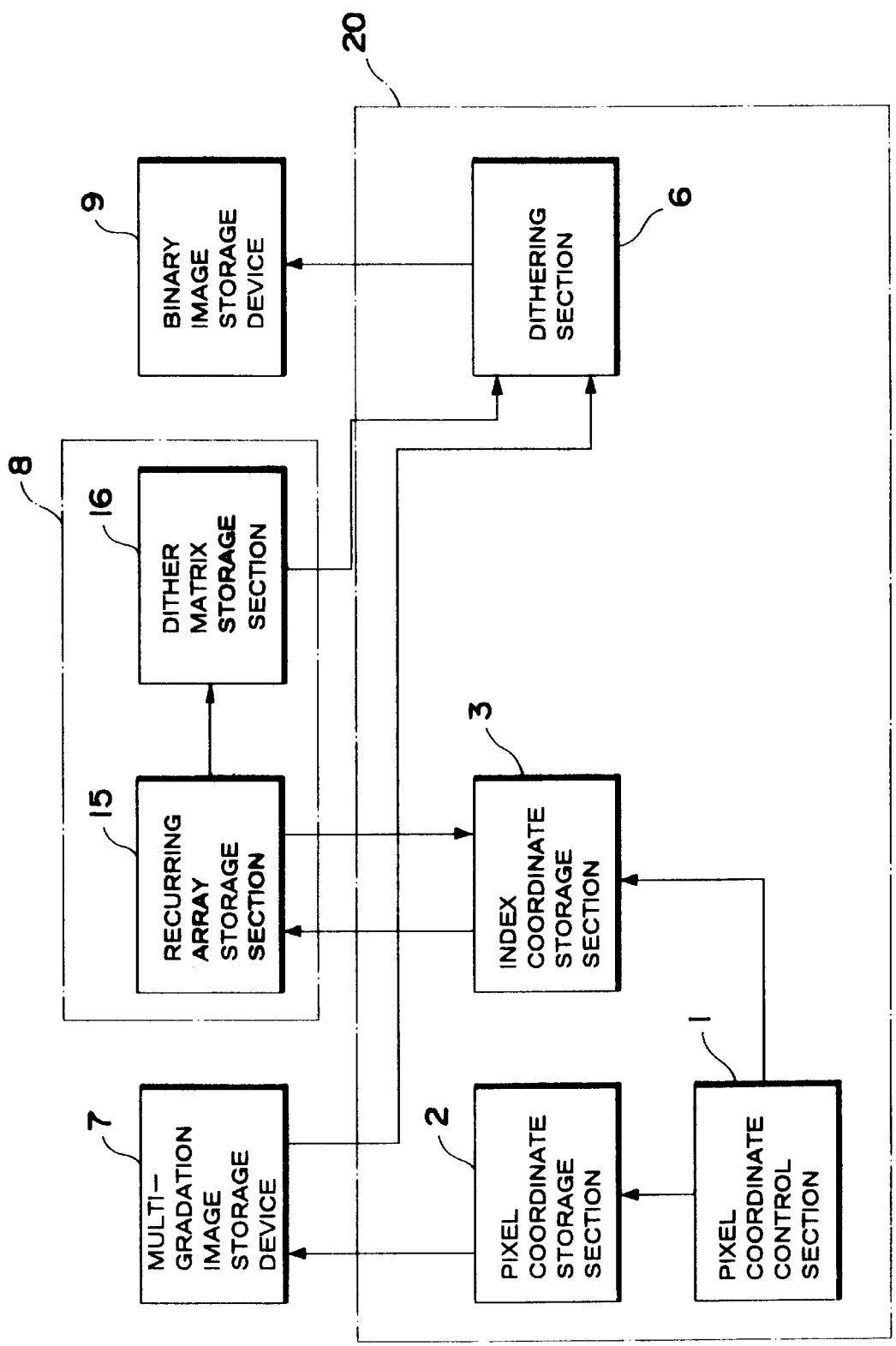
FIG. 5 is a diagram showing a structure of a dithering device according to a second preferred embodiment of the present invention.

FIG. 5 is a diagram showing a structure of a dithering device in the second preferred embodiment. The second preferred embodiment differs from the first preferred embodiment in that the recurring arrays 20a and 20b are stored in advance in this embodiment and that no section corresponding to the recurring array producing section 4 provided in the first preferred embodiment is provided in this embodiment. In this embodiment, a storage device 8 comprises a recurring array storage section 15 for storing in advance the recurring arrays 20a and 20b suitable for the dither matrix 2001, and a dither matrix storage section 16 for storing in advance the dither matrix 2001. The other structure is essentially the same as that of the first referred embodiment.

FIG. 6 is a flowchart showing an operation of the dithering device in this embodiment. As shown in FIG. 6, the operation of the dithering device in this embodiment is the same as that of the dithering device in the first preferred embodiment, except that step S10 required in the first preferred embodiment is not required in this embodiment.

As described above, according to the dithering device of the second preferred embodiment, since the recurring arrays 20a and 20b are stored in advance, the processing for producing the recurring arrays 20a and 20b can be omitted.

Now, the third preferred embodiment of the present invention will be described hereinbelow.

Figure 7B:
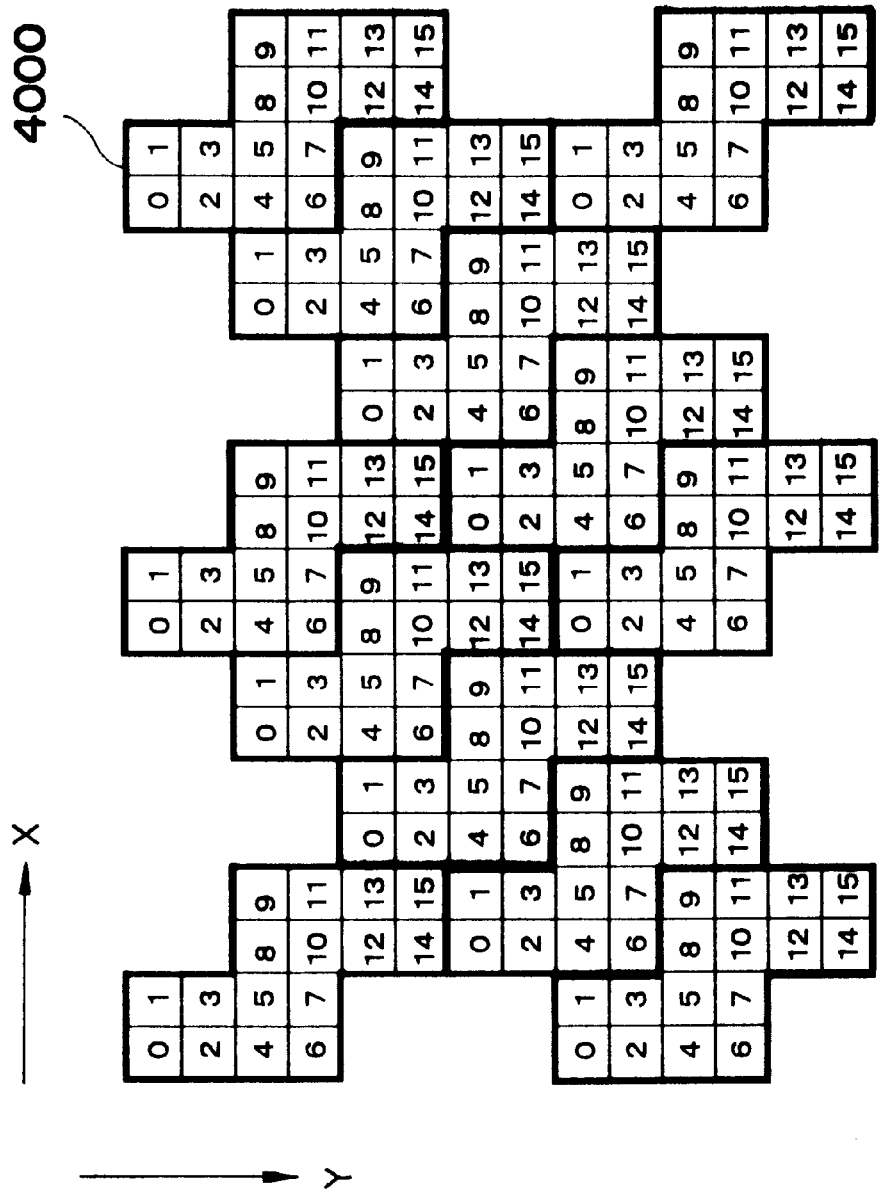
FIGS. 7A and 7B are diagrams showing an essentially Z-shaped modified dither matrix and a modified dither pattern, respectively, suitable for dithering a color image.
Figure 7A:
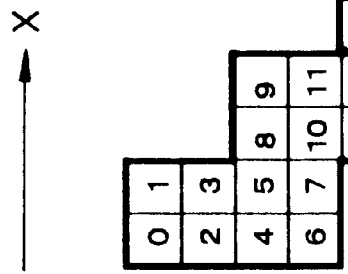
Figures 8A, 8B:
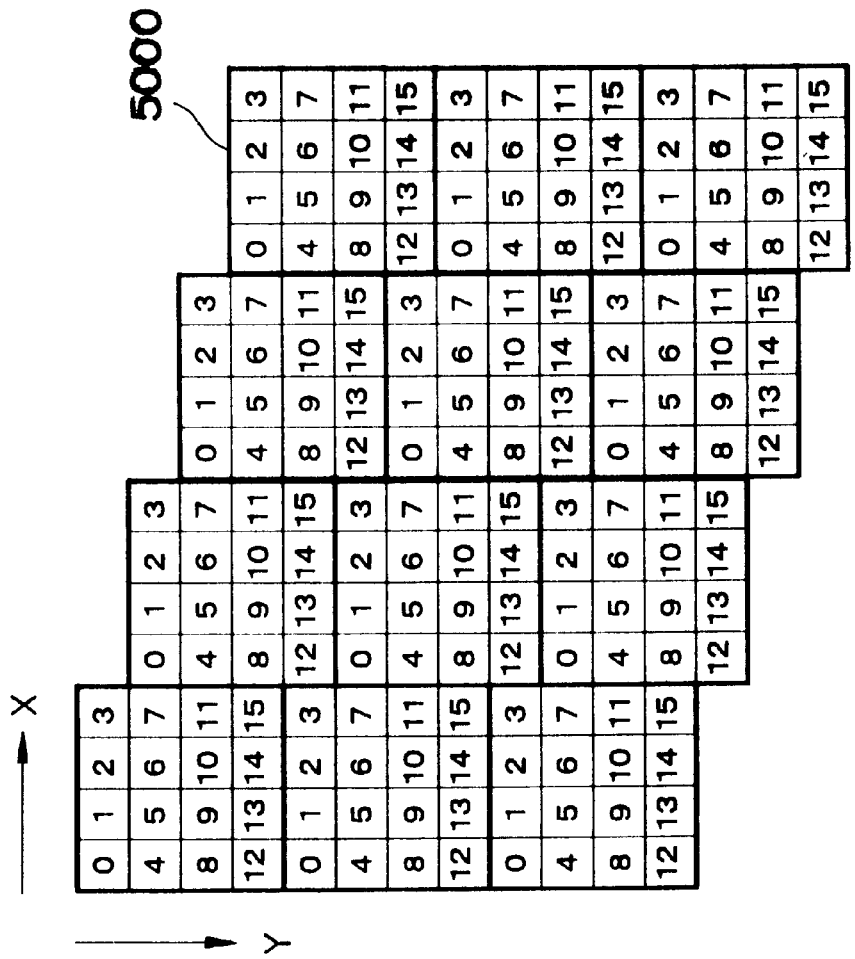
FIGS. 8A and 8B are diagrams showing a rectangular dither matrix and a modified dither pattern, respectively, suitable for dithering a color image.

For dithering a color image, it is preferable to use a modified dither matrix and a modified dither pattern which are suitable for dealing with the screen angle pertaining to improvement in reproducibility of the color image. As an example thereof, there can be cited an essentially Z-shaped modified dither matrix 4001 as shown in FIG. 7A and a modified dither pattern 4000 composed of the plurality of dither matrices 4001 as shown in FIG. 7B. As another example, there can be cited a rectangular dither matrix 5001 as shown in FIG. 8A and a modified dither pattern 5000 composed of the plurality of dither matrices 5001 as shown in FIG. 8B.

Figures 9A, 9B:
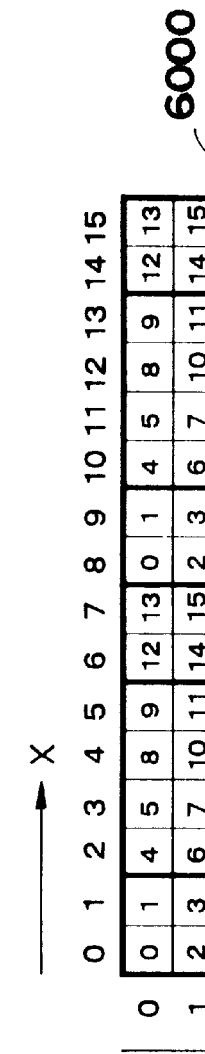
FIG. 9A is a diagram showing a basic rectangular dither pattern which is formed using the plurality of essentially Z-shaped modified dither matrices shown in FIG. 7A.
FIG. 9B is a diagram showing a rectangular modified dither pattern which is composed of the plurality of basic rectangular dither patterns shown in FIG. 9A and used in dithering according to a third preferred embodiment of the present invention.

However, it is difficult to process the rectangular multi-gradation image 1000 using such a non-rectangular modified dither pattern 4000 or 5000. In this regard, it is preferable to form a basic rectangular dither pattern 6001 using the plurality of essentially Z-shaped dither matrices 4001 as shown in FIG. 9A, and carry out the dithering using a rectangular dither pattern 6000 as shown in FIG. 9B which is composed of the plurality of basic rectangular dither patterns 6001. In the basic rectangular dither pattern 6001, however, a relationship among indices is complicated. Thus, processing for specifying an index (Px, Py) corresponding to a pixel (X, Y) becomes complicated, resulting in possibility that much time is required for the processing.

A dithering device in this embodiment carries out the dithering logically using the dither pattern 6000 shown in FIG. 9B. Numerals (0 to 15) are assigned to elements in the dither matrix thereby to facilitate explanation of this embodiment.

Figure 10:
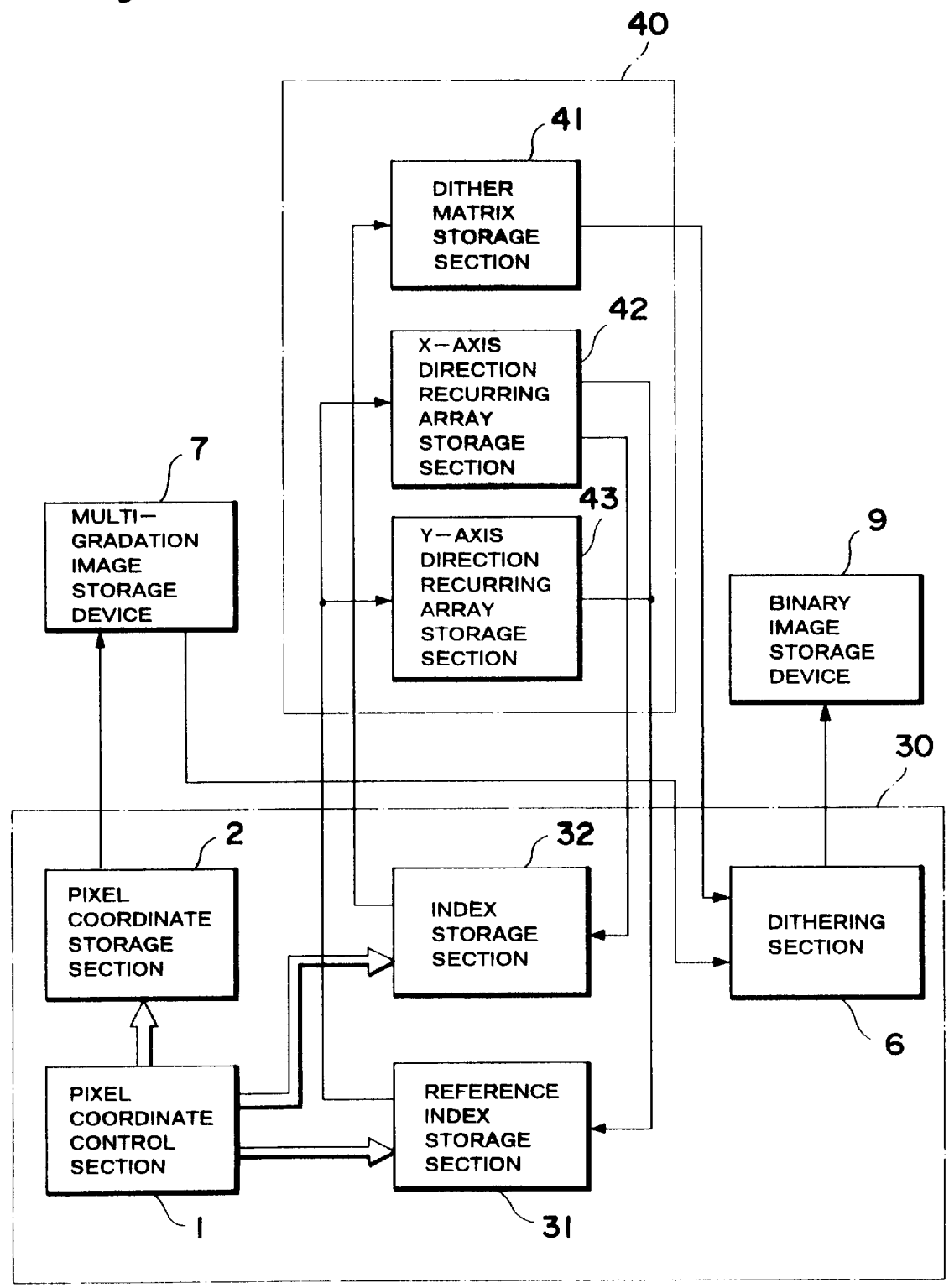
FIG. 10 is a diagram showing a structure of a dithering device according to the third preferred embodiment of the present invention.

FIG. 10 is a diagram showing a structure of the dithering device in this embodiment. In the figure, the dithering device includes a dithering unit 30 which comprises a pixel coordinate controlling section 1, a pixel coordinate storage section 2, a dithering section 6, a reference index storage section 31 and an index storage section 32. The dithering device further includes a multi-gradation image storage device 7, a binary image storage device 9 and a storage device 40 including a dither matrix storage section 41, an X-axis direction recurring array storage section 42 and a Y-axis direction recurring array storage section 43. The pixel coordinate control section 1, the pixel coordinate storage section 2, the dithering section 6, the multi-gradation image storage device 7 and the binary image storage device 9 function like those in the foregoing first and second preferred embodiments. As will be described later, the reference index storage section 31 and the index storage section 32 store reference indices and indices, respectively.

Figure 11:
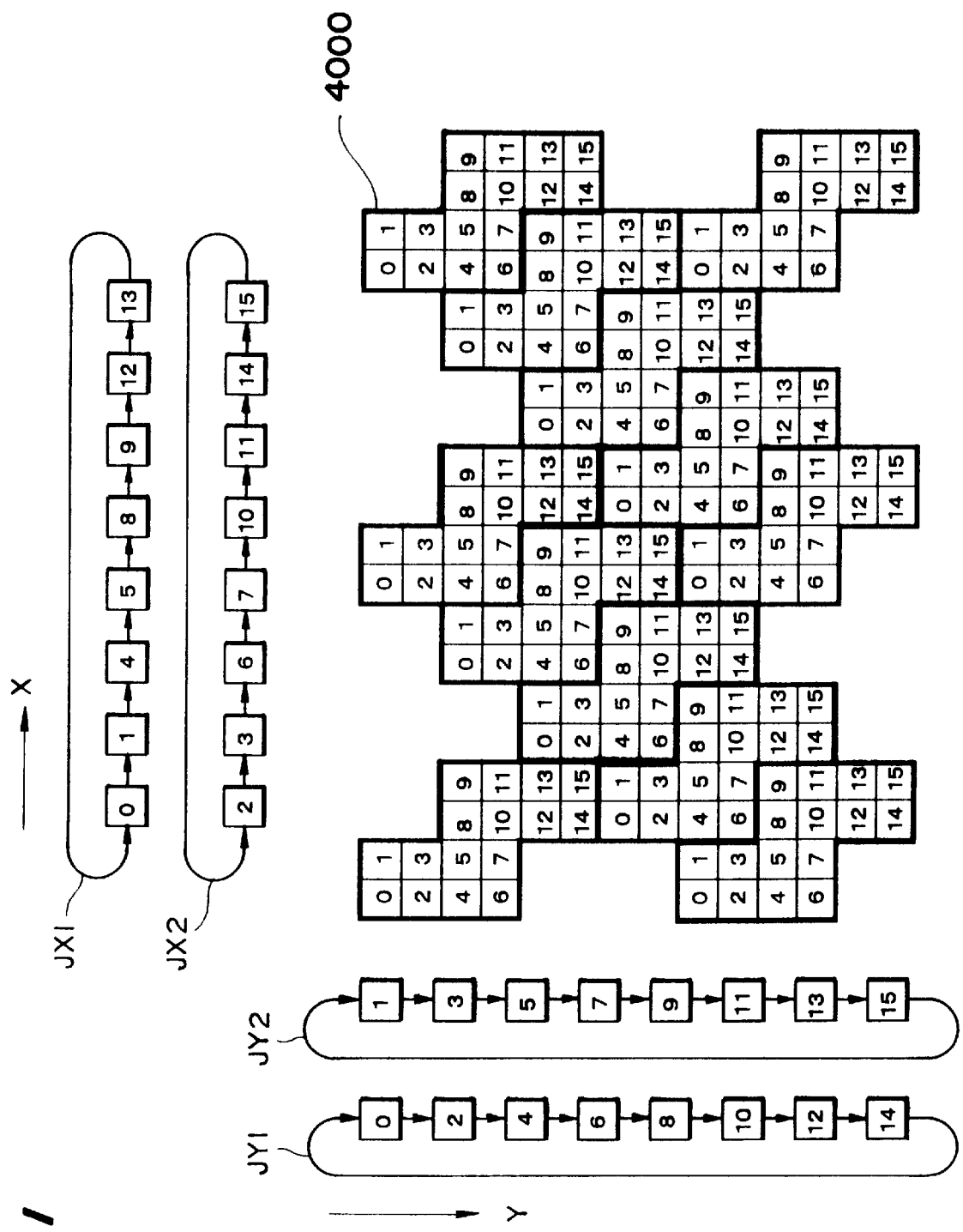
FIG. 11 is a diagram showing the modified dither pattern shown in FIG. 7B and recurring index rows and columns according to the third preferred embodiment of the present invention.

FIG. 11 is a diagram showing the modified dither pattern 4000 and recurring index rows and columns according to the third preferred embodiment. With respect to the modified dither pattern 4000, indices consecutive in the X-axis direction are, when represented by using the foregoing numerals (0 to 15), classified into a first index row JX1 recurring like 0→1→4→5→8→9→1→2→1→3→0→1 . . . and a second index row JX2 recurring like 2→3→6→7→10→11→14→15→2→3 . . . Similarly, as shown in FIG. 11, indices consecutive in the Y-axis direction are classified into a first index column JY1 and a second index column JY2. As shown in FIG. 12A, a recurring array 20x is produced from the first index row JX1 and the second index row JX2 and stored in the X-axis direction recurring array storage section 42. Similarly, as shown in FIG. 12B, a recurring array 20y is produced from the first index column JY1 and the second index column JY2 and stored in the Y-axis direction recurring array storage section 43. Referring to the recurring array 20x, a next index Pxn corresponding to, for example, a current index Pxc=12 is 13, and a next index Pxn corresponding to a current index Pxc=13 is 0, which corresponds to the advance of 12→13 →0.

Referring back to FIG. 10, the dither matrix storage section 41 stores threshold values of the dither matrix 4001 in terms of the corresponding indices.

In the following description, it is assumed that the dithering is started from a pixel (3, 4) (hereinafter referred to as "initial pixel") on the multi-gradation image 1000.

Figure 13:
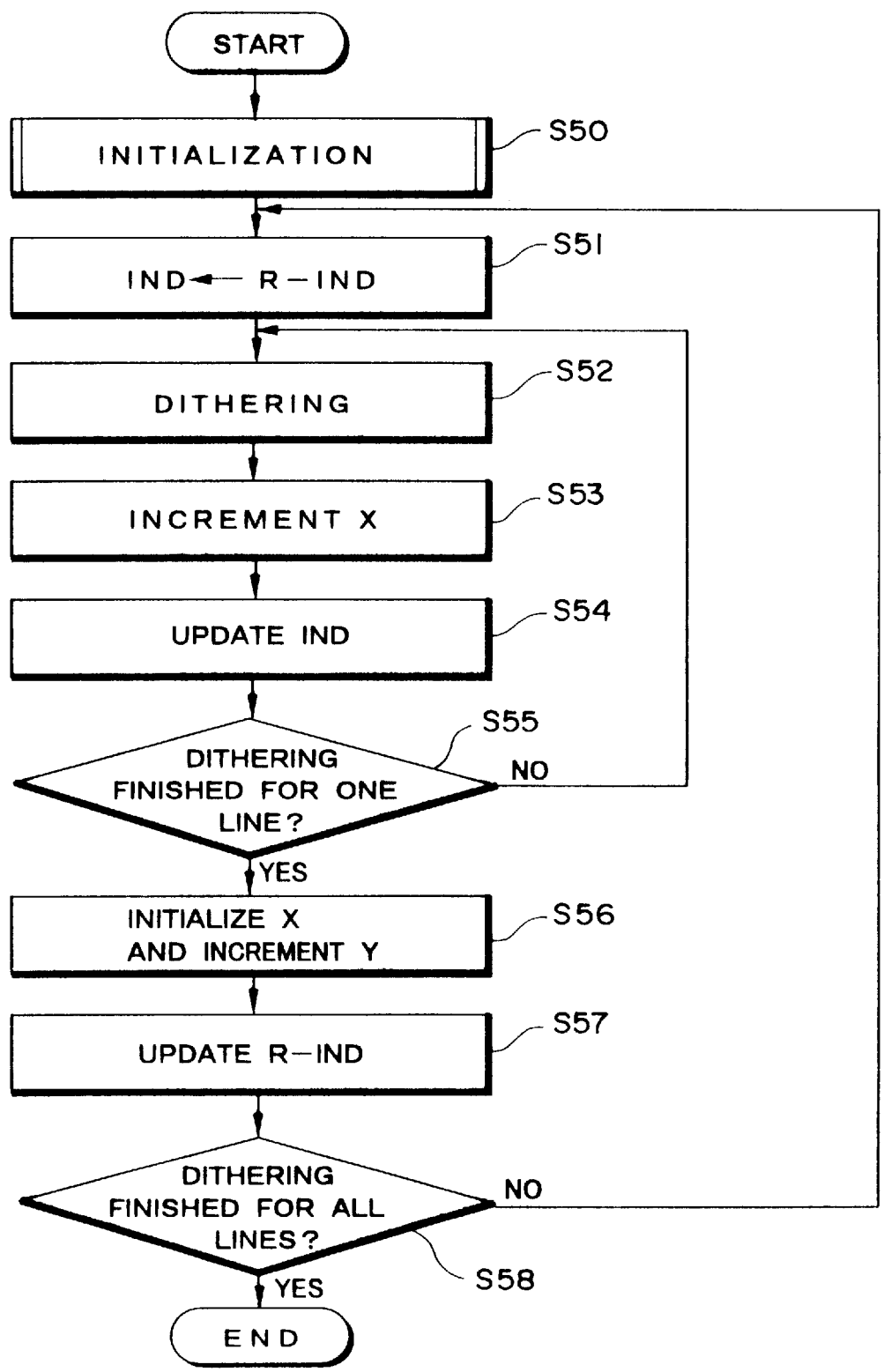
FIG. 13 is a flowchart representing an operation of the dithering device shown in FIG. 10.

FIG. 13 is a flowchart showing an operation of the dithering device according to the third preferred embodiment.

At step S50, with respect to a pixel (X, Y) to be dithered, initialization is carried out such that X=3 and Y=4. Further, a reference index R-IND being an index having a threshold value corresponding to a pixel located at the head of a line to be dithered is initialized to 0.

Figure 14:
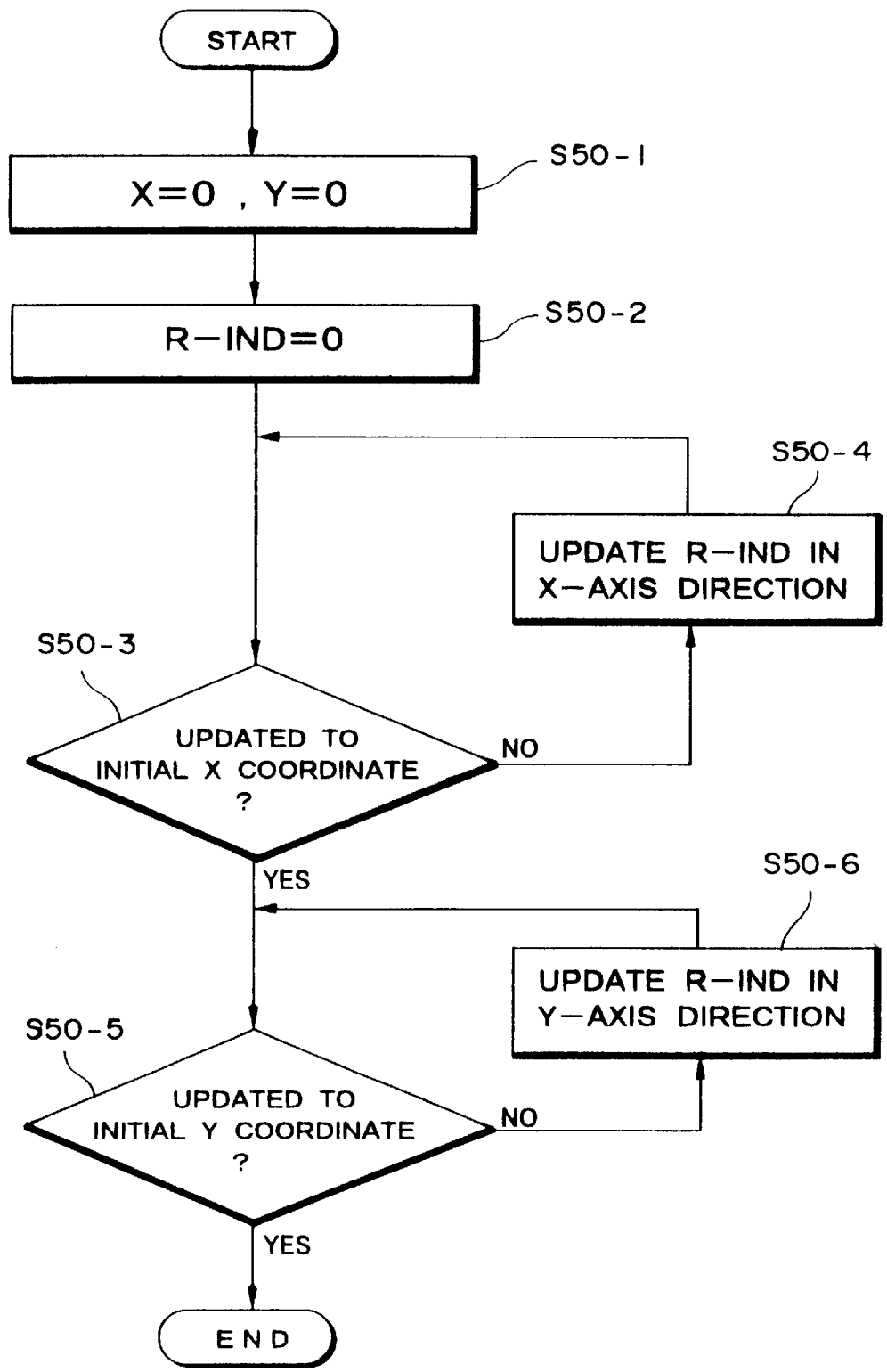
FIG. 14 is a flowchart representing an initialization process carried out in the flowchart shown in FIG. 13.

Specifically, as shown in FIG. 14, at steps S50-1 and S50-2, X=0, Y=0 and R-IND=0 are set. Then at steps S50-3 and S50-4, since a value of X of the initial pixel is 3, R-IND is updated by 3 in the X-axis direction. More specifically, by referring to the recurring array 20x, Pxn=1 corresponding to Pxc=0, Pxn=4 corresponding to Pxc=1 and Pxn=5 corresponding to Pxc=4 are learned. As a result, R-IND=5 is provisionally obtained. Then at steps S50-5 and S50-6, since a value of Y of the initial pixel is 4, the foregoing RIND=5 is updated in the Y-axis direction. More specifically, by referring to the recurring array 20y, Pyn=7 corresponding to Pyc=5, Pyn=9 corresponding to Pyc=7, Pyn=11 corresponding to Pyc=9 and Pyn=13 corresponding to Pyc=11 are learned. As a result, R-IND=13 is obtained as a reference index corresponding to the initial pixel (3, 4).

Referring back to FIG. 13, at step S51, the value of R-IND is set to an index IND so that IND=13. Thereafter, a value of IND changes as a pixel to be dithered changes. At step S52, dithering is carried out, i.e. a value of a pixel to be dithered and a threshold value of an index corresponding to the pixel are compared with each other so as to assign black or white to that pixel. Specifically, at this time, a value IMG (3, 4) of the pixel (3, 4) and a threshold value THR (13) as represented by IND=13 are compared with each other so as to assign black or white to the pixel (3, 4).

At step S53, a value of X is incremented by 1 so as to select a pixel (4, 4) next to the initial pixel (3, 4) in the X-axis direction as a pixel to dithered next. At step S54, the recurring array 20x is referred to so that Pxn=0 is obtained as corresponding to Pxc=13. Accordingly, it is learned that a threshold value THR (0) as represented by IND=0 should be used for dithering the pixel (4, 4).

At step S55, it is determined whether the dithering of pixels for one line has been finished. If not yet finished, the routine returns to step S52 where the next pixel as updated at step S53 is dithered. If finished, the routine proceeds to step S56 where a value of X is set to the value of X of the initial pixel (3, 4) and a value of Y is incremented by 1. Specifically, at this time, when the dithering of a final pixel (15, 4) on the line where the initial pixel (3, 4) is located has been finished, the routine proceeds to step S56 where a pixel (3, 5) is selected as a pixel to be dithered next.

At step S57, the recurring array 20y is referred to with respect to a reference index R-IND so that Pyn=15 is obtained as corresponding to Pyc=13. As a result, it is learned that an index corresponding to the pixel (3, 5) is IND=15. Then, R-IND is updated from 13 to 15. At step S58, it is determined whether the dithering for all the lines has been finished. If not yet finished, the routine returns to step S51 to repeat the dithering. On the other hand, if finished for all the lines, all the processing is completed. Thus, by finishing the dithering of a pixel (15, 15), all the processing is completed.

As described above, according to the dithering device of the third preferred embodiment, with respect to the modified dither pattern 6000 having the index rows JX1 and JX2 recurring in the X-axis direction and the index columns JY1 and JY2 recurring in the Y-axis direction, the recurring arrays 20x and 20y are produced from the index rows JX1 and JX2 and the index columns JY1 and JY2, respectively. Thus, even in the dithering using the modified dither pattern 6000, the indices corresponding to the pixels can be derived only by referring to the recurring arrays 20x and 20y without using the modulo arithmetic method or the conditional branching method. As a result, like in the first and second preferred embodiments using the rectangular dither pattern 2000, the processing amount for determining the indices can be reduced so that the processing time can be shortened as compared with the dithering using the modulo arithmetic method or the conditional branching method.

Further, since it is not necessary to store the whole modified dither pattern 6000 as opposed to the dithering using the modulo arithmetic method or the conditional branching method, the storage capacity can be reduced.

In contrast with this embodiment in which the recurring arrays 20x and 20y are produced, the recurring arrays 20x and 20y which have been produced may be stored in advance in such a recurring array storage section 15 as in the second embodiment. This enables the dithering device to implement dithering process more efficiently than that of the third embodiment.

If a magnified binary image is required from the multi-gradation image 1000, it can be obtained by repeating the dithering of each pixel as many times as the required magnification. For example, if the image 1000 is magnified three times, the pixel (3, 4) is dithered three times using threshold values THR (13), THR (0) and THR (1). In this fashion, each pixel is dithered and magnified three times in the X-axis direction so that a magnified binary image can be obtained.

While the present invention has been described in terms of the preferred embodiments, the invention is not to be limited thereto, but can be embodied in various ways without departing from the principle of the invention as defined in the appended claims.

What is claimed is:

1. A dithering device for converting a multi-gradation image into a binary image by comparing, in sequence, values of pixels forming the multi-gradation image with threshold values assigned to elements forming a dither matrix which elements are logically located at positions corresponding to positions of the pixels, said dithering device comprising:

a storage circuit storing an array representing a relationship between a first group of the positions of the elements each corresponding to first one of the pixels and a second group of the positions of the elements each corresponding to second one of the pixels, said second one of the pixels compared next to the corresponding first one of the pixels; and a determination circuit which, by referring to said array, determines the position of the element from said second group based on the position of the element in said first group for comparing said second one of the pixels with the threshold value of the element determined by said determination circuit.

2. The dithering device according to claim 1, further comprising a producing circuit for producing said array based on said dither matrix.

3. The dithering device according to claim 1, wherein said storage circuit stores in advance said array which is produced based on said dither matrix.

4. The dithering device according to claim 1, wherein the relationship of said array recurs per cycle of the number of said elements.

5. A dithering device for converting a multi-gradation image into a binary image by comparing, in sequence, values of pixels forming the multi-gradation image with threshold values assigned to elements forming a dither matrix which elements are logically located at positions corresponding to positions of the pixels, said dithering device comprising:

a first storage circuit storing a first array representing a relationship between a first group of the positions of the elements each corresponding to first one of the pixels and a second group of the positions of the elements each corresponding to second one of the pixels, said second one of the pixels compared next to the corresponding first one of the pixels in an X-axis direction of the multi-gradation image;

a second storage circuit storing a second array representing a relationship between a third group of the positions of the elements each corresponding to third one of the pixels and a fourth group of the positions of the elements each corresponding to fourth one of the pixels, said fourth one of the pixels compared next to the corresponding third one of the pixels in a Y-axis direction of the multi-gradation image; and a determination circuit which, by referring to one of said first and second arrays, determines the position of the element from one of said second and fourth groups based on the position of the element in one of said first and third groups for comparing one of said second and fourth ones of the pixels with the threshold value of the element determined by said determination circuit.

6. The dithering device according to claim 5, wherein said dither matrix has an essentially Z shape.

7. The dithering device according to claim 6, wherein the relationship of each of said first and second arrays recurs per cycle of the number of said elements.

* * * * *